United States Patent
Babitz et al.

(12)
(10) Patent No.: US 6,338,463 B1
(45) Date of Patent: Jan. 15, 2002

(54) HANGING ASSEMBLY

(76) Inventors: John Babitz; Colleen Babitz, both of 1518 Casa Grande Blvd., Fort Collins, CO (US) 80526

( * ) Notice: Subject to any disclaimer, the term of this patent is extended or adjusted under 35 U.S.C. 154(b) by 0 days.

(21) Appl. No.: 09/564,720

(22) Filed: May 4, 2000

(51) Int. Cl.[7] .................................................. A47H 1/10
(52) U.S. Cl. ........................ 248/317; 248/306; 248/914
(58) Field of Search ................................. 248/317, 304, 248/306, 322, 339, 691, 692, 307, 914

(56) References Cited

U.S. PATENT DOCUMENTS

| 70,749 | A | * | 11/1867 | Sargent | 248/304 |
| 224,003 | A | * | 2/1880 | Drew | 248/304 |
| 908,320 | A | * | 10/1908 | Page | 248/304 |
| 1,767,897 | A | | 6/1930 | Roman et al. | |
| D256,738 | S | | 9/1980 | Dockery | |
| 4,897,952 | A | | 2/1990 | Hawie | |
| 5,005,266 | A | * | 4/1991 | Fister et al. | 24/601.5 |
| D342,889 | S | | 1/1994 | Adams | |
| 5,329,675 | A | * | 7/1994 | McLean et al. | 24/599 |
| 5,624,094 | A | | 4/1997 | Protz, Jr. | |
| 5,940,943 | A | * | 8/1999 | Kloster | 24/573.5 |

\* cited by examiner

*Primary Examiner*—Ramon O. Ramirez
*Assistant Examiner*—A. Joseph Wujciak

(57) ABSTRACT

A hanging assembly for deterring theft in bathroom stalls. The hanging assembly includes a base portion. The base portion has a first end, a second end, a front surface and a back surface. A first arm is elongate and has a distal end and a proximal end. The distal end of the arm is fixedly coupled to the first end of the base portion. The first arm extends away from the base portion. A second arm has a distal end, a proximal end and a middle portion. The distal end of the second arm is integrally coupled to the second end of the base portion. The second arm extends away from the base portion. A latch portion has a first end and a second end. The first end of the latch portion is coupled to the proximal end of the second arm by a hinge. The latch portion has a length such that the second end of the latch portion is abutted against an interior surface of the first arm.

6 Claims, 1 Drawing Sheet

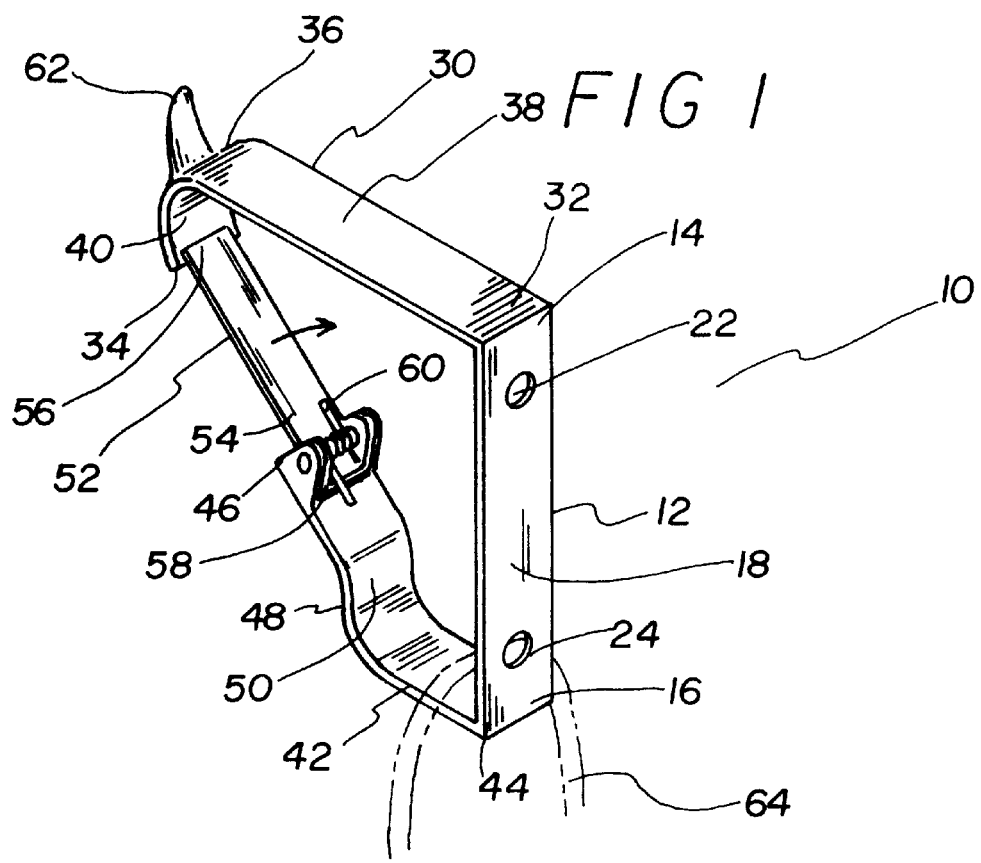
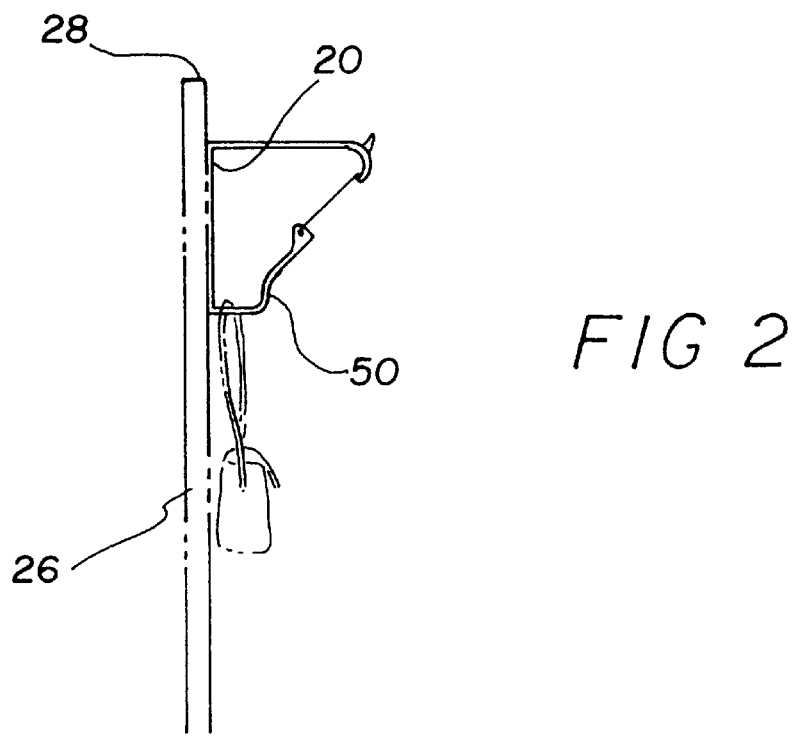

HANGING ASSEMBLY

BACKGROUND OF THE INVENTION

1. Field of the Invention

The present invention relates to hanging devices and more particularly pertains to a new hanging assembly for deterring theft in bathroom stalls.

2. Description of the Prior Art

The use of hanging devices is known in the prior art. More specifically, hanging devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,767,897; U.S. Pat. No. 5,624,094; U.S. Pat. No. 4,897,952; U.S. Pat. No. 342,889; U.S. Des Pat. No. 256,738; and U.S. Pat. No. 4,858,870.

While these devices fulfill their respective, particular objectives and requirements, the aforementioned patents do not disclose a new hanging assembly. The inventive device includes a base portion. The base portion has a first end, a second end, a front surface and a back surface. A first arm is elongate and has a distal end and a proximal end. The distal end of the arm is fixedly coupled to the first end of the base portion. The first arm extends away from the base portion. A second arm has a distal end, a proximal end and a middle portion. The distal end of the second arm is integrally coupled to the second end of the base portion. The second arm extends away from the base portion. A latch portion has a first end and a second end. The first end of the latch portion is coupled to the proximal end of the second arm by a hinge. The latch portion has a length such that the second end of the latch portion is abutted against an interior surface of the first arm.

In these respects, the hanging assembly according to the present invention substantially departs from the conventional concepts and designs of the prior art, and in so doing provides an apparatus primarily developed for the purpose of deterring theft in bathroom stalls.

SUMMARY OF THE INVENTION

In view of the foregoing disadvantages inherent in the known types of hanging devices now present in the prior art, the present invention provides a new hanging assembly construction wherein the same can be utilized for deterring theft in bathroom stalls.

The general purpose of the present invention, which will be described subsequently in greater detail, is to provide a new hanging assembly apparatus and method which has many of the advantages of the hanging devices mentioned heretofore and many novel features that result in a new hanging assembly which is not anticipated, rendered obvious, suggested, or even implied by any of the prior art hanging devices, either alone or in any combination thereof.

To attain this, the present invention generally comprises a base portion. The base portion has a first end, a second end, a front surface and a back surface. A first arm is elongate and has a distal end and a proximal end. The distal end of the arm is fixedly coupled to the first end of the base portion. The first arm extends away from the base portion. A second arm has a distal end, a proximal end and a middle portion. The distal end of the second arm is integrally coupled to the second end of the base portion. The second arm extends away from the base portion. A latch portion has a first end and a second end. The first end of the latch portion is coupled to the proximal end of the second arm by a hinge. The latch portion has a length such that the second end of the latch portion is abutted against an interior surface of the first arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hanging assembly apparatus and method which has many of the advantages of the hanging devices mentioned heretofore and many novel features that result in a new hanging assembly which is not anticipated, rendered obvious, suggested, or even implied by any of the prior art hanging devices, either alone or in any combination thereof.

It is another object of the present invention to provide a new hanging assembly which may be easily and efficiently manufactured and marketed.

It is a further object of the present invention to provide a new hanging assembly which is of a durable and reliable construction.

An even further object of the present invention is to provide a new hanging assembly which is susceptible of a low cost of manufacture with regard to both materials and labor, and which accordingly is then susceptible of low prices of sale to the consuming public, thereby making such hanging assembly economically available to the buying public.

Still yet another object of the present invention is to provide a new hanging assembly which provides in the apparatuses and methods of the prior art some of the advantages thereof, while simultaneously overcoming some of the disadvantages normally associated therewith.

Still another object of the present invention is to provide a new hanging assembly for deterring theft in bathroom stalls.

Yet another object of the present invention is to provide a new hanging assembly which includes a base portion. The base portion has a first end, a second end, a front surface and a back surface. A first arm is elongate and has a distal end and a proximal end. The distal end of the arm is fixedly coupled to the first end of the base portion. The first arm extends away from the base portion. A second arm has a distal end, a proximal end and a middle portion. The distal end of the second arm is integrally coupled to the second end of the base portion. The second arm extends away from the base portion. A latch portion has a first end and a second end. The first end of the latch portion is coupled to the proximal end of the second arm by a hinge. The latch portion has a length such that the second end of the latch portion is abutted against an interior surface of the first arm.

Still yet another object of the present invention is to provide a new hanging assembly that is mountable to a bathroom stall door. A purse or other such item may be hung from the hanging assembly and two hands are needed to remove the item such that a thief would have difficulty reaching over the stall door and taking the item.

Even still another object of the present invention is to provide a new hanging assembly that contains a hook for hanging items of clothing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 a schematic perspective view of a new hanging assembly according to the present invention.

FIG. 2 a schematic side view of the present invention.

DESCRIPTION OF THE PREFERRED EMBODIMENT

With reference now to the drawings, and in particular to FIGS. 1 through 2 thereof, a new hanging assembly embodying the principles and concepts of the present invention and generally designated by the reference numeral 10 will be described.

As best illustrated in FIGS. 1 through 2, the hanging assembly 10 generally comprises a base portion 12. The base portion has a first end 14, a second end 16, a front surface 20 and a back surface 18. The base portion 12 has a pair of bores 22, 24 therein. A first 22 of the bores is generally adjacent to the first end 14. A second 24 of the bores is generally adjacent to the second end 16 of the base portion 12. The base portion 12 is a plate and is preferably generally planar. The base portion has a generally rectangular shape.

A pair of fasteners, not shown, fastens the base portion 12 to a door 26. Each of the fasteners is adapted for extending through one of the bores 22, 24 and into the door 26. Each of the fasteners is a screw. The first edge 14 of the base portion 12 extends toward a top edge 28 of the door 26 when the base portion 12 is mounted on the door 26.

A first arm 30 is elongate and has a distal end 32 and a proximal end 34. The distal end 32 of the arm 30 is fixedly coupled to the first end 14 of the base portion 12. The first arm 30 extends away from the base portion 12. The first arm 30 is orientated generally perpendicular to the base portion 12. The first arm 30 has a curved portion 36. The curved portion is located generally adjacent to the proximal end 34 of the first arm 30 such that the proximal end 34 of the first arm 30 is directed toward the second end 16 of the base portion 12. The first arm 30 has an exterior surface 38 and an interior surface 40. The interior surface 40 faces the second end 16 of the base portion 12. The first arm 30 has a length substantially equal to a length of the base portion 12.

A second arm 42 has a distal end 44, a proximal end 46 and a middle portion 48. The distal end 44 of the second arm 42 is integrally coupled to the second end 16 of the base portion 12. The second arm 42 extends away from the base portion 12. A portion of the second arm 42 between the middle portion 48 and the distal end 44 of the second arm 42 extends in the same direction of and is orientated generally parallel with the first arm 30. The second arm 42 has a bend 50 therein. The bend 50 is located in the middle portion 48 of the second arm 50 such that the proximal end 46 of the second arm 42 extends toward the proximal end 34 of the first arm 30. The proximal end 34 of the first arm 30 is spaced from the proximal end 46 of the second arm 42.

A latch portion 52 has a first end 54 and a second end 56. The first end 54 of the latch portion 52 is coupled to the proximal end 46 of the second arm 42 by a hinge 58. The latch portion 52 has a length such that the second end 56 of the latch portion 52 is abutted against the interior surface 40 of the curved portion 36 of the first arm 30 in a closed position of the latch portion 52 to form a closed loop with the first 30 and second arms 42 and the base portion 12. The latch portion 52 has an open position when the latch portion 52 is pivoted away from the interior surface 40 of the curved portion 36 of the first arm 30. The latch 52 is generally planar, and preferably has a generally rectangular shape.

A spring urges 60 the latch 52 in a closed position. The spring 60 is mounted on the hinge 58.

A protruding member 62 is fixedly coupled to the exterior surface 38 of the first arm 30. The protruding member 62 is located on the curved portion 36 of the first arm 30. The protruding member 32 forms a hook.

In use, a purse or similar item with a handle portion 64 is placed within the loop created by the latch 52 when it is in a closed position. In order to remove the purse, two hands are needed. A first and to press latch 52 into an open position, and the second to lift the article hanging on the assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hanging assembly, said assembly being mountable to a door, said assembly comprising:

a base portion, said base portion having a first end, a second end, a front surface and a back surface;

a first arm, said first arm being elongate, said first arm having a distal end and a proximal end, said distal end of said arm being fixedly coupled to said first end of said base portion, said first arm extending away from said base portion;

said first arm being orientated generally perpendicular to said base portion, said first arm having a curved portion, said curved portion being located generally adjacent to said proximal end of said first arm such that said proximal end of said first arm is directed toward said second end of said base portion, said first arm having an exterior surface and said interior surface, said interior surface facing said second end of said base portion;

a second arm, said second arm having a distal end, a proximal end and a middle portion, said distal end of said second arm being integrally coupled to said second end of said base portion, said second arm extending away from said base portion;

a portion of said second arm between said middle portion and said distal end of said second arm extending in the same direction of and being orientated generally parallel with said first arm, said second arm having a bend therein, said bend being located in said middle portion of said second arm such that said proximal end of said second arm extends toward said proximal end of said first arm, said proximal end of said first arm being spaced from said proximal end of said second arm;

a latch portion, said latch portion having a first end and a second end, said first end of said latch portion being coupled to said proximal end of said second arm by a hinge, said latch portion having a length such that said second end of said latch portion is abutted against an interior surface of said first arm; and said latch portion having a length such that said second end of said latch portion is abutted against said interior surface of said curved portion of said first arm in a closed position of said latch portion to form a closed loop with said first and second arms and said base portion, said latch portion having an open position when said latch portion is pivoted away from said interior surface of said curved portion of said first arm.

2. The hanging assembly as in claim 1, wherein said base portion comprises:

said base portion having a pair of bores therein, a first of said bores being generally adjacent to said first end, a second of said bores being generally adjacent to said second end of said base portion, said base portion being a plate, said base portion being generally planar, said base portion having a generally rectangular shape.

3. The hanging assembly as in claim 2, further comprising:

a pair of fasteners for fastening said base portion to the door, each of said fasteners being adapted for extending through one of said bores and into said door, each of said fasteners being a screw.

4. The hanging assembly as in claim 1, further comprising:

a spring for urging said latch in a closed position, said spring being mounted on said hinge.

5. The hanging assembly as in claim 1, further comprising:

a protruding member, said protruding member being fixedly coupled to said exterior surface of said first arm, said protruding member being located on said curved portion of said first arm.

6. A hanging assembly, said assembly comprising:

a base portion, said base portion having a first end, a second end, a front surface and a back surface, said base portion having a pair of bores therein, a first of said bores being generally adjacent to said first end, a second of said bores being generally adjacent to said second end of said base portion, said base portion being a plate, said base portion being generally planar, said base portion having a generally rectangular shape;

a pair of fasteners for fastening said base portion to a door, each of said fasteners being adapted for extending through one of said bores and into said door, each of said fasteners being a screw, wherein said first edge of said base portion extends toward a top edge of said door when said base portion is mounted on said door;

a first arm, said first arm being elongate, said first arm having a distal end and a proximal end, said distal end of said arm being fixedly coupled to said first end of said base portion, said first arm extending away from said base portion, said first arm being orientated generally perpendicular to said base portion, said first arm having a curved portion, said curved portion being located generally adjacent to said proximal end of said first arm such that said proximal end of said first arm is directed toward said second end of said base portion, said first arm having an exterior surface and an interior surface, said interior surface facing said second end of said base portion, said first arm having a length substantially equal to a length of said base portion;

a second arm, said second arm having a distal end, a proximal end and a middle portion, said distal end of said second arm being integrally coupled to said second end of said base portion, said second arm extending away from said base portion, a portion of said second arm between said middle portion and said distal end of said second arm extending in the same direction of and being orientated generally parallel with said first arm, said second arm having a bend therein, said bend being located in said middle portion of said second arm such that said proximal end of said second arm extends toward said proximal end of said first arm, said proximal end of said first arm being spaced from said proximal end of said second arm;

a latch portion, said latch portion having a first end and a second end, said first end of said latch portion being coupled to said proximal end of said second arm by a hinge, said latch portion having a length such that said second end of said latch portion is abutted against said interior surface of said curved portion of said first arm in a closed position of said latch portion to form a closed loop with said first and second arms and said base portion, said latch portion having an open position when said latch portion is pivoted away from said interior surface of said curved portion of said first arm, said latch being generally planar, said latch having a generally rectangular shape;

a spring for urging said latch in a closed position, said spring being mounted on said hinge; and a protruding member, said protruding member being fixedly coupled to said exterior surface of said first arm, said protruding member being located on said curved portion of said first arm, said protruding member forming a hook.

* * * * *